United States Patent [19]
Wood

[11] 3,929,418
[45] Dec. 30, 1975

[54] DUAL CROSS-FLOW CANISTER

[75] Inventor: Vernon E. Wood, St. Paul, Minn.

[73] Assignee: Minnesota Mining and Manufacturing Company, St. Paul, Minn.

[22] Filed: Aug. 31, 1973

[21] Appl. No.: 393,337

[52] U.S. Cl. ............ 23/288 FB; 23/288 FC; 60/299; 423/212; 252/477 R
[51] Int. Cl.² ...................... B01J 35/04; F01N 3/15
[58] Field of Search ...... 23/288 F, 288 FB, 288 FC; 60/287, 289, 290, 295, 301, 307; 423/212, 213.2, 213.7; 165/180; 220/8 A

[56] References Cited
UNITED STATES PATENTS

| | | | |
|---|---|---|---|
| 3,172,251 | 3/1965 | Johnson | 23/288 FC UX |
| 3,224,842 | 12/1965 | Manske | 23/277 C |
| 3,295,919 | 1/1967 | Henderson et al. | 23/288 F X |
| 3,441,382 | 4/1969 | Keith et al. | 23/288 F |
| 3,597,165 | 8/1971 | Keith et al. | 23/288 F |
| 3,607,133 | 9/1971 | Hirao et al. | 23/288 F |
| 3,692,497 | 9/1972 | keith et al. | 23/288 F |
| 3,771,661 | 11/1973 | Barnebey | 55/502 X |
| 3,773,894 | 11/1973 | Bernstein et al. | 23/288 F X |

Primary Examiner—Morris O. Wolk
Assistant Examiner—Michael S. Marcus
Attorney, Agent, or Firm—Alexander, Sell, Steldt & DeLaHunt

[57] ABSTRACT

A container is provided for facial mounting of a dual cross-flow supported catalyst wherein manifolding inlet and outlet means bring exhaust gases to and away from the supported catalyst at right angles to the direction of flow through the catalyst and means are provided for introduction of air as desired between the reduction of nitrogen oxides and oxidation of carbon monoxide and hydrocarbons.

2 Claims, 6 Drawing Figures

DUAL CROSS-FLOW CANISTER

This invention relates to a canister for the facial mounting of a dual cross-flow supported catalyst and particularly to a canister in which means are provided so that direction of gas flow entering the catalyst is changed by 90° to the plane of flow through the support.

In the co-pending application of James R. Johnson, Ser. No. 321,021, filed Jan. 4, 1973, now U.S. Pat. No. 3,860,535, are described dual cross-flow supported catalyst systems which permit simultaneously effecting two reactions, one of which is endothermic or requires elevated temperatures and one of which is exothermic, in a single supported catalyst structure. These structures are intended particularly for use in automobile exhaust systems to render pollutants innocuous. Inasmuch as dwell time is very short and catalytic effects can only be expected for those molecules of the gas stream which contact the catalyst, it is especially necessary to provide a canister system for the supported catalyst which permits introduction of exhaust from the engine with thorough mixing and turbulence. Additional air is usually required to be thoroughly mixed into the gases for oxidation of carbon monoxide and hydrocarbons.

It is an object of this invention to provide a canister for a dual cross-flow supported catalyst in which there is good turbulence and into which extra air can be admitted as needed. Other objects will become evident hereinafter.

A canister is provided having manifolding means permitting introduction of waste gases or exhaust gases at right angles to the planes of passage ways in the catalyst support so that the gases undergo a change of direction of 90° before entering and after leaving the catalyst support. Changes in direction of the stream from entry to exit total about 450°. The catalyst support is positioned by open-faced frame members of the canister with packing means applied around the margins of the active faces of the catalyst support. Air is admitted between catalytic stages. In a preferred embodiment venturi means are provided for enhancing ease of admission of air.

Because of the relatively large active faces, i.e., the surface areas of catalyst support provided for passage of gas, and because the change of direction is more than 360°, there appears to be a useful muffling effect without excessive back-pressure.

This invention will be more readily understood by reference to the accompanying drawings wherein.

Figure 1:
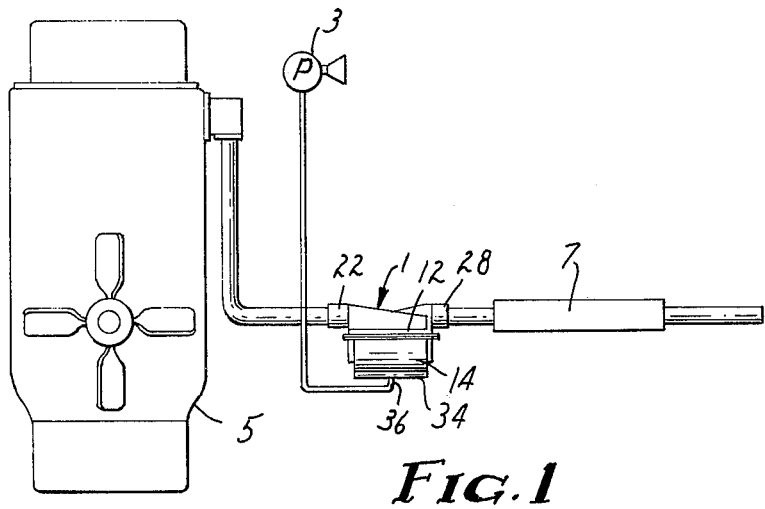
FIG. 1 is a diagrammatic representation of the manner in which a canister of the invention is employed.

Referring to FIG. 1, it will be seen that a canister of the invention 1 is connected to pump 3 for introduction of air and the inlet side is attached to engine 5 and the outlet to muffler 7. Automatic means (not shown) may be included for regulating the amount of air added depending on motor conditions as will be evident to those of skill in the art.

Figure 2:
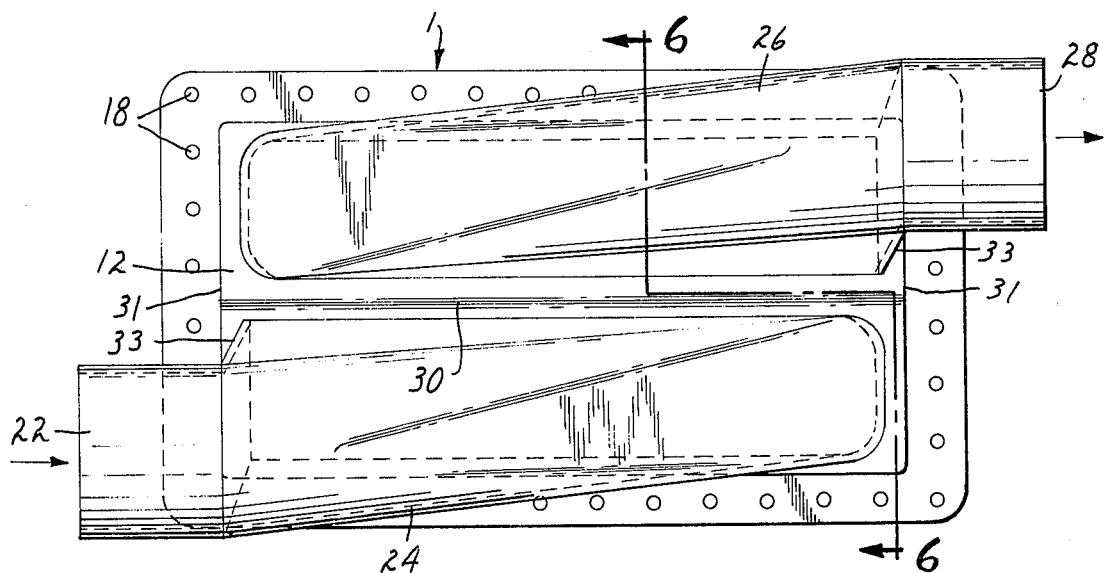
FIG. 2 is a top view of a canister of the invention.
Figure 3:
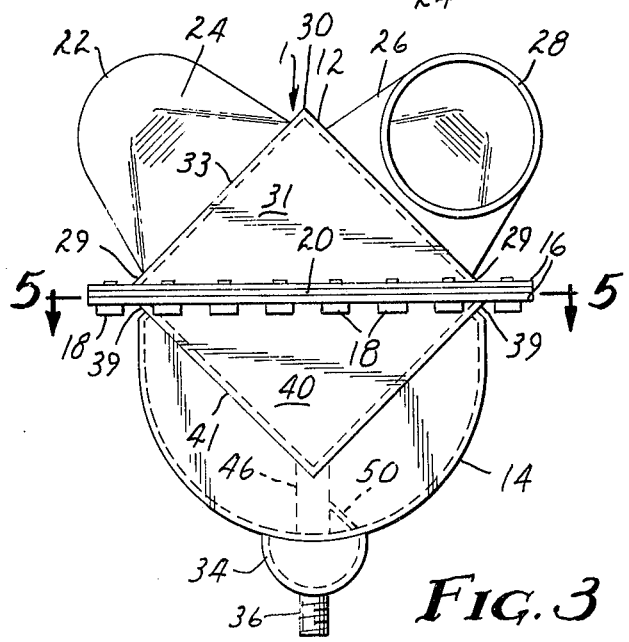
FIG. 3 is an end view of a canister of the invention.
Figure 4:
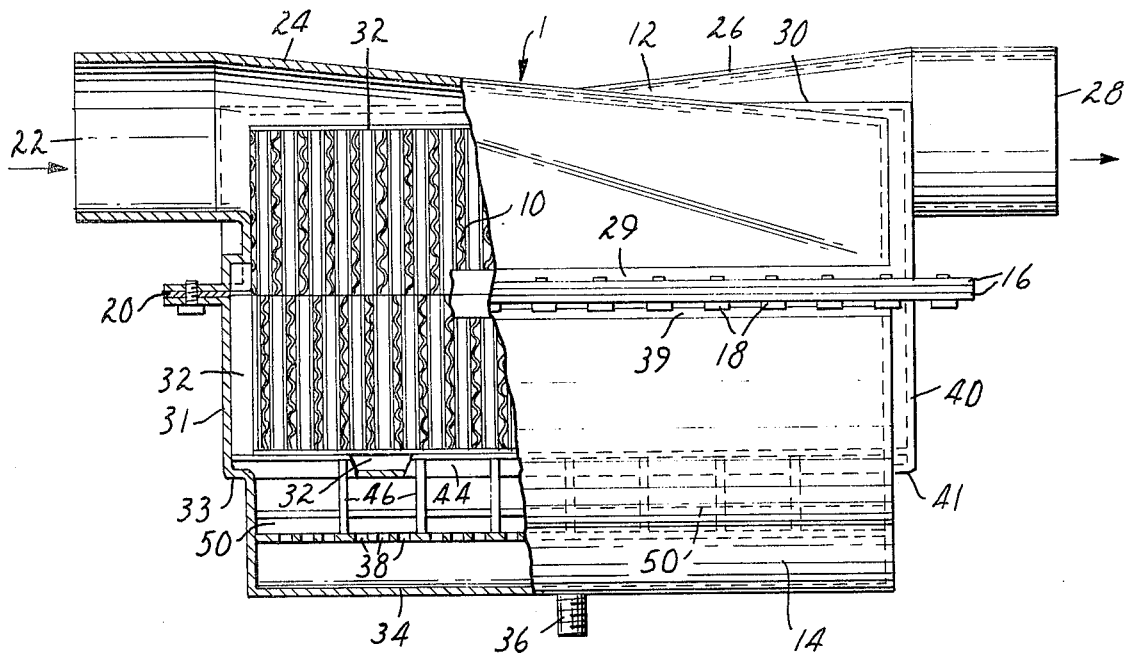
FIG. 4 is a side elevation, partly broken away, of a canister of the invention.
Figure 5:
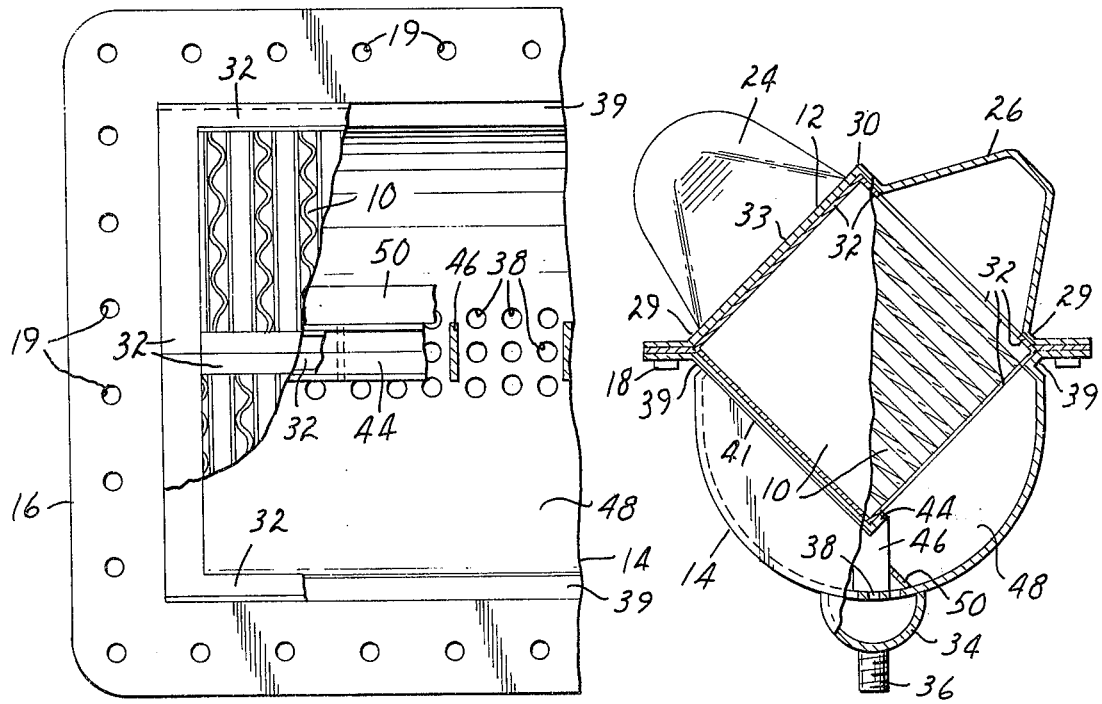
FIG. 5 is a section at 5—5 of the canister of FIG. 3 showing a portion broken away to show details.
Figure 6:
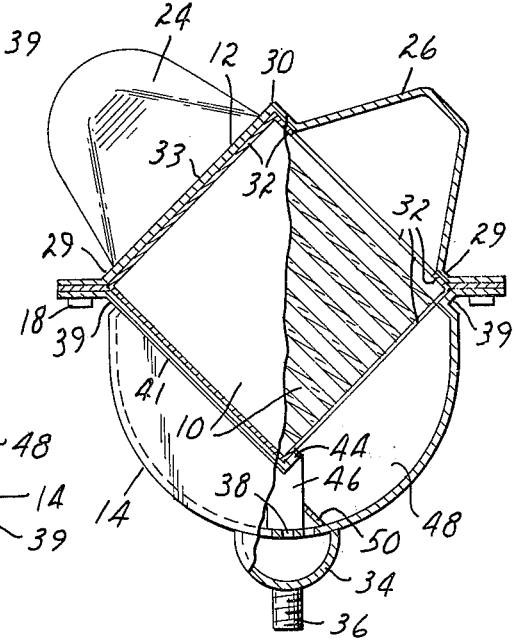
FIG. 6 is a section at 6—6 of the canister of FIG. 2 partially broken away to shown internal features.

FIGS. 2 and 3 show a canister of the invention and FIGS. 4 through 6 show a dual cross-flow supported catalyst 10 mounted in the canister. The preferred catalyst support is square in cross-section and has a height at right angles to the square section which may equal or be less or more than a side of the square. It is preferred that the height be greater than a side of the square.

In FIG. 3, it will be seen that in the present embodiment the canister consists of an upper part or cover 12 and lower part or base 14 mating at peripherally flanged rectangular openings and joined at flanges 16 by screws or bolts 18 with gasketing means 20. It is contemplated that other means for joining the parts may be used such as welding, crimping or other such operations. The canister may be constructed, for example, from mild or non-corrosive sheet steel about 0.15 cm. thick (16 gauge; 0.060 inches). The ceramic structure which constitutes the catalyst support 10 of generally parallelepipedal form with longitudinal axis and square cross-section is shown in part in FIGS. 4, 5 and 6 as will become evident shortly. The catalyst support has catalyst thereon and has passageways at right angles to the longitudinal axis in approximately equal groups which groups are mutually at right angles to each other. The material of construction of the support is a refractory and preferably a refractory ceramic such as cordierite, alumina or zircon-mullite. The dual cross-flow refractory ceramic catalyst support has all its passageways at right angles to its longitudinal axis and in two directions which are mutually at right angles to each other. The catalyst support has catalyst on it and is positioned within the casing as more fully described below.

As seen in FIGS. 3 to 6, upper part or cover 12 is basically a triangular right prism with open faces having a frame consisting essentially of peak or ridge 30, cross-rails 29, side rails 33 and end pieces 31 providing a frame congruent with faces of the catalyst support. End pieces 31 are right triangles with equal sides having the hypotenuses along sides of the rectangular opening of the cover. Cross rails 29 connect the acute angles of end pieces 31. Side rails 33 are along the equal sides of the end pieces. Inlet port 22, inlet manifold 24 outlet port 28 and outlet manifold 26 are attached at the open faces of the frame with the ports facing 180° from each other at opposite ends of the canister. Inlet manifold 24 and outlet manifold 26 are first and second manifolding means respectively which are parallel to and along the sides of ridge 30 connecting to ridge 30, side rails 33 and cross rails 29 lengthwise of cover 12. Centerlines of the inlet and outlet parts are offset from one another. Side rails 33 are along the equal sides of the end pieces. The manifolds preferably vary in cross-section such that as inlet gasses pass through the catalyst support, one-half of which fits into the prism of upper part 12, the inlet manifold decreases in cross-section and the outlet manifold increases along that axis. This appears to permit flow to be better distributed through the catalyst support. Any convenient method for achieving the variation in manifold cross-section may be used such as, for example, cutting a pipe at an acute angle to its axis. As shown in the drawings, the manifold cross-section also includes shaping of the cut pipe to spread the distal portion, that is the part farthest removed from the port, so that the manifold extends over a substantially uniform width as shown in FIGS. 2, 3, 4 and 6.

The peak 30 of the upper part 12 forms an internal angle which serves in positioning catalyst support 10 in the canister. Insulating and packing material 32 is provided at points of contact between the supporting surfaces of the open-faced frame of the canister and the peripheries or margins of the active faces of the catalyst support. Thus the outer 6 mm (¼ inch) of the faces of the catalyst support are covered by a suitable packing which provide secure support during thermal cycling, as well as, at peak 30, prevents blow-by of gases from one stream to another. It will be evident that narrower or wider marginal strips of packing may be used as circumstances dictate. Mounting using packing around the peripheries or margins of the active faces is herein termed facial mounting. An especially preferred type of packing material is described in an application of others filed of even date herewith (Ser. No. 393,587 ) which employs vermiculite in unexpanded form which subsequently expands on heating.

Lower part or base 14 is of generally semicircular cross-section as seen in FIGS. 3 and 6 except at the ends 40 which are right triangular support frames covering the right angles at the base and equal sides forming side rails 41 on the generally semicircularly shaped end member. The base has a rounded bottom with sides extended toward a first pair of opposite sides of the rectangular opening of the base and shaped to form lower cross rails between said side and the flanged edge. The generally semicircularly shape end members are attached to the rounded bottom and have walls extended toward the second pair of opposite sides of the rectangular opening of the base. The base is deeper than semicylindrical containing a plenum space formed by the rounded bottom, end members and extended sides. The hypotenuses of the support frames being at the edges of the end member form two sides of the rectangular opening of the base has an air inlet manifold 34 at the bottom of the semicircular or semicylindrical part with air inlet connection 36. Holes 38 are provided between air inlet manifold 34 and the plenum space 48 of lower part 14 for admission of air. A triangular right prism support frame with open faces into which the lower half of the catalyst support fits is formed by lower cross rails 39; side rails 41 and bottom channel or angle support member 44 which is supported at a uniform distance from the bottom of lower part 14 by channel supports 46. In FIG. 4, a portion of bottom channel 44 is shown broken away to show the packing 32 used under catalyst support 10. In FIG. 5, a portion of the catalyst is shown with packing 32 resting in place on it and then broken away to show bottom channel 44 with packing 32 in place and this is further broken away to show holes 38 and channel supports 46. In the preferred embodiment of the present canister, a venturi baffle 50 is provided up stream from the air holes 38 which provides a partial vacuum as gases pass it and which thus assists in drawing air into plenum 48. A venturi baffle will be seen to be a slightly inclined strip which produces a slight constriction of the stream of exhaust gases and hence effects a suction or vacuum immediately downstream.

Although packing 32 is provided at the end of catalyst support 10 as shown in FIG. 5, this need not be tightly packed but should be resilient because of differential thermal expansion lengthwise of the canister.

It will be seen that gas entering inlet port 22 and inlet manifold 24 changes direction, with creation of turbulence, while passing through catalyst support 10 in a first direction, enters plenum 48 where it may be mixed with air entering through holes 38 to whatever extent is desired and assisted by venturi baffle 50. The gas then passes through the catalyst support in the cross-flow direction and emerges into outlet manifold 26 and leaves by outlet port 28.

A suitable catalyst support to be included in a canister of the invention may be 3 inches (7.6 cm) square and 9 inches (23 cm) long. With the dimensions of active faces with 6 mm margins covered as noted above, this provides an effective face area of about 21¼ in² (138 cm²) and a catalytic volume of about 63¾ in³ (1060 cm³).

What is claimed is:

1. A container or canister for connection into the exhaust stream of an engine and for positioning a catalyst support in said stream comprising, in combination,
   I. a casing containing and holding a catalyst support, said casing having two parts, a cover and a base, said cover and said base mating and being joined at respective peripherally flanged rectangular openings,
   A. said base having
      1. a rounded bottom with extended sides extended toward a first pair of opposite sides of the rectangular opening of said base, said base having generally semicircularly shaped end members attached to said rounded bottom with extended side walls extended toward the second pair of opposite sides of the rectangular opening of said base, said rounded bottom, said end members and said extended sides forming a plenum space, the portion of the extended sides of the rounded bottom adjacent to said first pair of opposite sides of said peripherally flanged opening being shaped to provide lower cross rails;
      2. said end members comprising right-triangular support frames, said support frames having equal sides meeting at a right angle, said right angle being located near the rounded bottom of said base, the hypotenuses of said support frames forming the top edges of said end members which hypotenuses are the second pair of opposite sides of the rectangular opening of said base and the equal sides of said support frames forming side rails;
      3. an air inlet manifold and air inlets along the rounded bottom of said base at its deepest part for admitting air into the said plenum space and
      4. an angle support member above said air inlets connecting the right angles of said support frames;
   B. said cover having
      1. right triangular end pieces having the right angle at the apex, the hypotenuses mating with the triangular support frames of the end members of the base and having equal sides;
      2. a ridge connecting the right angles of said right-triangular end pieces and forming an internal angle therebetween;
      3. cross rails connecting the acute angles of said triangular end pieces and 4. side rails along the sides of said triangular end pieces between said ridge and said cross rails,
5. first manifolding means parallel to and along one side of said ridge and lengthwise of said cover connecting to said ridge, side rails and cross rail with inlet port for inlet of said exhaust stream at one end and
6. second manifolding means parallel to and along the other side of said ridge connecting to said ridge, side rails and cross rail lengthwise of said cover with outlet port facing in the opposite direction to said inlet port for release of said exhaust stream, the centerlines of said inlet and outlet ports being offset from one another, II. said container or canister further comprising a dual cross-flow refractory ceramic catalyst support of parallelepipedal form with longitudinal axis and square cross-section having passageways at right angles to the said longitudinal axis, said passageways being in approximately equal groups and said groups being mutually at right angles to each other, said catalyst support having catalyst thereon and being positioned within said casing with its square ends resting in the right-triangular support frames of the end members of said base with its longitudinal axis parallel to the first pair of opposite sides of the rectangular opening in said base, one longitudinal edge of said catalyst support being supported free from the outer wall of the base of said casing in the angle support member thereof, two opposite longitudinal edges being supported at the sides of said base in the lower cross rails along each side of said base and the fourth longitudinal edge and the ends being engaged and urged into position by said ridge, said side rails and said cross rails of said cover, with said first and second manifolding means securely positioned above adjacent faces of said catalyst support, and III. said container or canister further comprising resilient mounting material between said catalyst support and the said ridge, said cross rails and said side rails of said cover of said canister at all lines of contact therebetween thereby preventing blowby of gases in said exhaust stream.

2. A container or canister according to claim 1 additionally comprising a venturi baffle upstream of the air inlet.

* * * * *